United States Patent

Waskiewicz et al.

[11] 4,059,310
[45] Nov. 22, 1977

[54] APPARATUS AND METHOD FOR UNIFORM POWDER FEED

[75] Inventors: John J. Waskiewicz, Wauwatosa; John H. Winston, Menomonee Falls, both of Wis.

[73] Assignee: Outboard Marine Corporation, Waukegan, Ill.

[21] Appl. No.: 379,361

[22] Filed: July 16, 1973

[51] Int. Cl.² ............................................. B65G 53/66
[52] U.S. Cl. ........................................ 302/42; 302/49
[58] Field of Search ..................... 302/22, 27, 35, 42, 302/49, 66

[56] References Cited

U.S. PATENT DOCUMENTS

| 1,206,112 | 11/1916 | Holbeck | 302/22 |
| 1,231,327 | 6/1917 | Brauchler | 302/22 |
| 1,365,663 | 1/1921 | Covert | 302/22 |
| 1,541,903 | 6/1925 | Crites | 302/22 |
| 2,608,446 | 8/1952 | Pota | 302/53 |
| 2,712,475 | 7/1955 | Lukes | 302/49 |
| 2,984,521 | 5/1961 | McCulloch | 302/28 |
| 3,268,266 | 8/1966 | Brown | 302/49 |
| 3,291,536 | 12/1966 | Smoot | 302/49 |
| 3,504,945 | 4/1970 | Leibundgut et al. | 302/40 |

FOREIGN PATENT DOCUMENTS

| 1,058,639 | 6/1952 | France | 302/42 |

Primary Examiner—Evon C. Blunk
Assistant Examiner—Jeffrey V. Nase
Attorney, Agent, or Firm—Michael, Best & Friedrich

[57] ABSTRACT

Disclosed herein is an apparatus for uniformly feeding particulate matter into a carrier gas, which apparatus includes a particulate matter inlet duct communicating with a carrier gas conduit, a device for introducing into the conduit upstream of the inlet duct, a flow of carrier gas which is maintained under constant pressure prior to introduction, a particulate matter pump communicating with the inlet duct and operable at a variable pumping rate to supply particulate matter through the inlet duct to the conduit, a device for sensing the pressure in the conduit, and a control connected to the pressure sensing means for varying the pumping rate of the pump in accordance with pressure variation in the conduit to maintain a uniform feed of particulate matter into the carrier gas flowing in the conduit.

12 Claims, 2 Drawing Figures

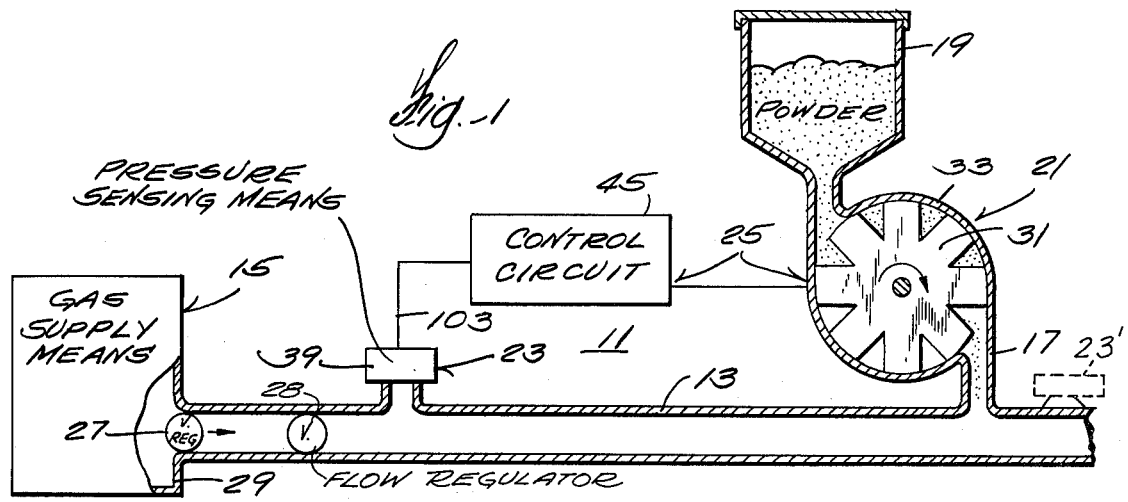
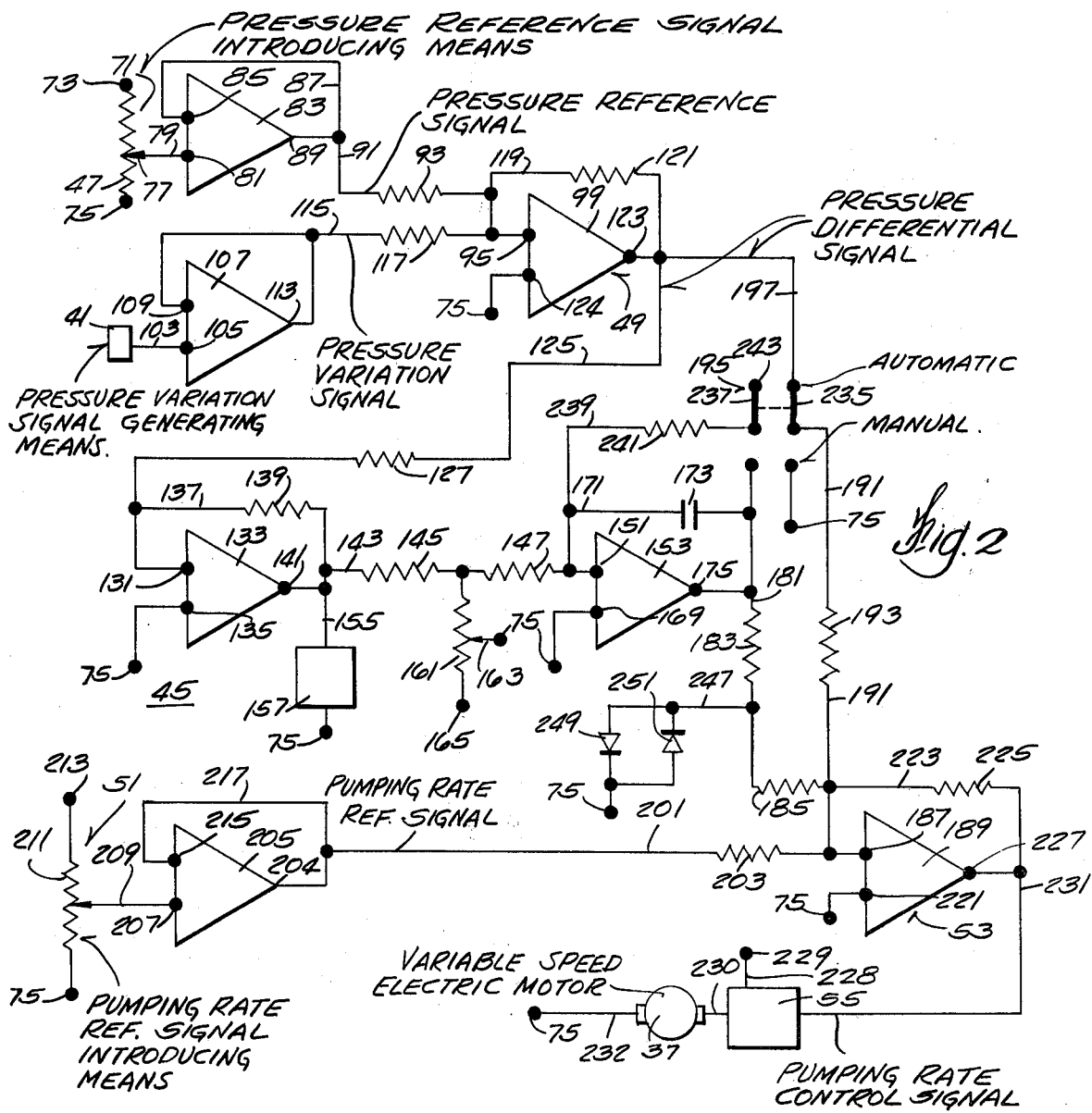

APPARATUS AND METHOD FOR UNIFORM POWDER FEED

RELATED APPLICATION

Reference is hereby made to our copending application Ser. No. 398,158 filed Sept. 17, 1973, now U.S. Pat. No. 3,909,664 granted Sept. 30, 1975.

BACKGROUND OF THE INVENTION

The invention relates generally to powder feed systems and, more particularly, to the feeding of particulate matter or powder into a carrier gas for conveyance to a deposit point for the particulate matter. Such plasma powder feed systems are useful for conveyance of flame spraying materials to be coated on a base surface.

SUMMARY OF THE INVENTION

The invention provides an apparatus for uniformly feeding substances, such as powder, into a carrier gas, such apparatus including an inlet duct communicating with a carrier gas conduit for introducing a substance into the conduit, means for introducing into the conduit upstream of the inlet duct, a flow of carrier gas which is maintained under a constant condition prior to such introduction, as for instance, under a constant pressure condition, a feed device or pump communicating with the inlet duct and operable at a variable feed or pumping rate to supply the substance through the inlet duct to the conduit, means for sensing one of the conditions in the conduit, as for instance, pressure, and means connected to the condition sensing means for varying the feed or pumping rate of the feed device or pump in accordance with variation in the one condition in the conduit to maintain a uniform feed of the substance into the carrier gas flowing in the conduit.

In further accordance with the invention, the feed or pumping rate varying means comprises a variable speed electric motor operably driving the pump and a control circuit including means for introducing a pressure reference signal of one polarity, means connected to the pressure sensing means and responsive thereto for generating a pressure variation signal having a potential which varies in accordance with the pressure in the conduit, means for combining the pressure reference signal and the pressure variation signal to generate a differential signal of variable potential, and means for applying the differential signal to the variable speed electric motor to vary the speed thereof and, accordingly, to vary the feed rate of the pump so as to maintain uniform feed of particulate matter into the carrier gas.

Still more particularly in accordance with the invention, the control circuit includes means for introducing a pumping rate reference signal and the means for applying the differential signal to the electric motor further comprises means for combining the differential signal with the pumping rate reference signal to generate a pumping rate control signal of variable potential, and means for applying the pumping rate control signal to the variable speed electric motor to vary the speed thereof and, accordingly, to vary the feed rate of the pump so as to maintain uniform feed of particulate matter into the carrier gas.

Also in accordance with the invention, there is provided a method of uniformly feeding particulate matter into a carrier gas comprising the steps of introducing a flow of carrier gas at a constant pressure into a conduit upstream of the introduction of particulate matter into the conduit by a pump operable at a variable pumping rate, sensing the pressure in the conduit downstream of the introduction of the carrier gas, and varying the pumping rate of the pump in accordance with the pressure sensed in the conduit to maintain uniform particulate matter feed into the carrier gas flowing in the circuit.

One of the principal features of the invention is the provision of a method and apparatus for providing uniform powder feed and, more particularly, for providing uniform powder feed into a tube or conduit having therein a carrier gas flowing from a source of constant pressure.

Other features and advantages of the invention will become known by reference to the following drawings, general description, and claims.

DRAWINGS

FIG. 1 is a schematic view of one apparatus which is constructed and which operates in accordance with the invention.

FIG. 2 is a schematic diagram of the control circuit referred to in FIG. 1.

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also it is to be understood that the phraseology or teminology employed herein is for the purpose of description and not of limitation.

GENERAL DESCRIPTION

Shown in FIG. 1 is an apparatus 11 which uniformly feeds a powder or particulate matter into a carrier gas and which functions in accordance with the invention method. The apparatus 11 comprises a carrier gas tube or conduit 13, means 15 connected to the conduit 13 for supplying into the conduit a flow of carrier gas which is maintained under constant pressure prior to introduction into the conduit 13, a powder inlet duct 17 communicating with the carrier gas conduit 13, a hopper 19 for containing a supply of powder to be fed into the carrier gas in the conduit 13, and a powder feed device or pump 21 communicating between the hopper 19 and the inlet duct 17 and operable at a variable pumping rate to supply powder from the hopper 19 through the inlet duct 17 into the conduit 13.

Also included in the apparatus is means 23 for sensing the pressure in the carrier gas conduit and means 25 connected to the pressure sensing means 23 for varying the pumping rate of the pump 21 in accordance with the pressure variation in the conduit 13 to maintain a uniform flow of powder into the carrier gas flowing in the conduit 13.

Any suitable carrier gas which is preferably inert, such as argon or helium, can be employed. In addition, any suitable means can be employed for supplying to the conduit 13 a flow of carrier gas maintained under constant pressure prior to supply to the conduit 13. For instance, in the illustrated construction, there is provided a tank 29 of high pressure carrier gas, which tank is connected to a pressure regulating valve 27 which, in turn, is connect to a flow regulating valve 28 which supplies a constant flow of carrier gas to the conduit 13.

The carrier gas flowing into the conduit is, accordingly, also at constant pressure immediately prior to introduction into the conduit 13. The pressure variation occurring in the conduit 13 consequent to the supply or introduction of powder is believed to be of very small magnitude as compared to the pressure drop occurring across the flow regulating valve.

Any suitable hopper and inlet duct construction can be employed. In addition, any suitable powder feed device or pump can be employed, which pump preferably is pressure balanced and operates without a material pressure differential between the hopper 19 and the inlet duct 17, and preferably includes a powder pumping rotor 31 operable in a housing 33 communicating between the hopper 19 and the inlet duct 17. The pump also preferably includes a variable speed electric motor 37 (See FIG. 2) which drives the rotor and which, in response to variation in speed, controls the weight of powder flowing into the inlet duct 17 and into the carrier gas conduit 13.

Various means can be employed for sensing the pressure in the carrier gas conduit 13. In the disclosed construction, such means comprises a transducer 39 which, as will hereinafter be described, also includes (See FIG. 2) means 41 for generating a pressure variation signal of one polarity with a potential which varies in accordance with the pressure variation in the carrier gas conduit 13. Preferably, the pressure sensing means 23 is located intermediate the carrier gas supply means 15 and the inlet duct 17. However, a pressure sensing means 23' could be located downstream of the powder inlet duct 17 as shown in dotted outline in FIG. 1.

Various means can be employed for varying the pumping rate of the pump in accordance with the pressure variation in the carrier gas conduit. In the disclosed preferred construction, such means comprises the variable speed electric motor 37 incorporated in the pump 21, together with a control circuit 45 which is shown in FIG. 2 and which also includes the before-mentioned pressure variation signal generating means 41. In addition, the control circuit 45 includes means 47 for introducing a pressure reference signal which is of adjustable constant potential but of opposite polarity from the polarity of the pressure variation signal. During normal operations, the setting of the pressure reference signal remains constant. However, the pressure reference signal can be manually adjusted between limits to accommodate changes in desired flow rates or materials, and to obtain optimum setting for a particular powder feed operation.

The control circuit 45 also includes means 49 for combining the pressure reference signal and the pressure variation signal to obtain or generate a differential or error signal of variable polarity and potential, and which is of one polarity, either positive or negative.

The control circuit 45 also includes means 51 for introducing a pumping rate reference signal (a reference electric motor speed signal) which affects the speed of the pump motor 37 and which is of adjustably constant potential. Preferably, the potential of the pumping rate reference signal can be manually adjusted within limits to provide motor operation at a speed which approximates uniform powder feed. Such speed can be initially adjustably varied as desired by manual adjustment of the pumping rate reference signal to obtain the optimum motor speed setting for a particular powder feed operation or to accommodate changes in materials, etc. Normally, however, the reference pumping rate signal remains unchanged during the continuance of normal operations. When the circuit 45 is in manual, as will hereinafter be mentioned, the pumping rate control signal is regulated essentially soley by the pumping rate reference signal introducing means.

The control circuit 45 also includes means 53 for combining the pumping rate reference signal and the differential signal to obtain or generate a pumping rate control signal which can be of either polarity and of varying potential.

The control circuit 45 further includes means 55 for applying the pumping rate control signal to the electric motor 37 to vary the rate of rotation of the rotor 31 so as to maintain uniform feed of powder into the carrier gas conduit 13. While other arrangements could be employed, in the illustrated and preferred construction, such means includes a pulse width modulator which, in response to the pumping rate control signal, directly controls the voltage applied to the electric motor 37 so as to increase or decrease the speed thereof, and thereby to maintain uniform powder feed into the carrier gas conduit.

More specifically, in the construction shown in FIG. 2, the means for introducing a pressure reference signal of adjustably constant potential is an adjustable potentiometer 71 connected between a source of current 73 and a common terminal or ground 75, and including an adjustable wiper 77. In turn, the wiper 77 is connected by a lead 79 to one input terminal 81 of a voltage follower 83 in the form of an integrated circuit operational amplifier. The other input terminal 85 of the voltage follower 83 is connected by a shunt lead 87 to the output terminal 89 of the voltage follower 83. In turn, the output terminal 89 is connected by a lead 91 through a resistor 93 to one of the input terminals 95 of a differential detector 99 which forms a part of the means 49 for combining the pressure reference signal and the pressure variation signal and which is in the form of an integrated circuit operational amplifier.

The pressure variation signal, as previously indicated, is generated by the transducer 39 which is connected by a lead 103 to one input terminal 105 of a voltage follower 107 in the form of an integrated circuit operational amplifier. The other input terminal 109 of the voltage follower 107 is connected by a shunt lead 111 to the output terminal 113 which, in turn, is connected through a lead 115 including a resistor 117 to the previously mentioned input terminal 95 of the differential detector 99.

The previously mentioned input terminal 95 of the differential detector 99 is also connected through a shunt lead 119 including a resistor 121 to the output terminal 123 of the differential detector 99. The other input terminal 124 of the differential detector is connected to the common terminal or ground 75.

The output of the differential detector 99 is the pressure differential signal which is fed from the differential detector 99 through a lead 125 including a resistor 127 to one input terminal 131 of an amplifier 133 in the form of an integrated circuit operational amplifier. The other input terminal 135 of the amplifier is connected to the common terminal or ground 75. A shunt lead 137 including a resistor 139 is connected between the input terminal 131 and the output terminal 141 of the amplifier 133, which output terminal 141 is connected to a lead 143 including two series connected resistors 145 and 147 to one input terminal 151 of an integrator 153 in the form of an integrated circuit operational amplifier.

The output terminal 141 of the amplifier 133 is also connected through a lead 155 to a null meter 157 which is connected to the common terminal or ground 75. The null meter 157 indicates the polarity and potential of the pressure differential signal as it leaves the amplifier 133.

Connected between the series connected resistors 145 and 147 is a variable potentiometer 161 which is connected to the common terminal or ground 75 through a wiper 163. The free end or terminal 165 of the potentiometer 161 is electrically unconnected. The other input terminal 169 of the integrator 153 is connected to the common terminal or ground 75 and a shunt lead 171 including a capacitor 173 is connected to each of the input terminal 151 and the output terminal 175.

The output terminal 175 of the integrator 153 is also connected through a lead 181 including two series connected resistors 183 and 185 to one input terminal 187 of a summing amplifier 189 in the form of an integrated circuit operational amplifier. The summing amplifier 189 forms part of the means combining the pumping rate reference signal and the pressure differential signal. In this last regard, the input terminal 187 of the summing amplifier 189 is also connected through a lead 191 including a resistance 193 to an automatic-manual switch 195 which, in turn, is connected through a lead 197 to the output terminal 123 of the differential detector 99.

The input terminal 187 of the summing amplifier 189 is also connected by a lead 201 including a resistance 203 to the output terminal 204 of a voltage follower 205 in the form of an integrated circuit operational amplifier. One input terminal 207 of the voltage follower 205 is connected to the wiper 209 of a variable potentiometer 221 which is connected between a suitable source of current 213 and the common terminal or ground 75 and which functions to introduce the pumping rate reference signal. The other input terminal 215 of the voltage follower 205 is connected through a shunt lead 217 to the output terminal 204.

The other input terminal 221 of the summing amplifier 189 is connected to the common terminal or ground 75. A shunt lead 223 including a resistor 225 connects the input terminal 187 to the output terminal 227 form which the pumping rate control signal travels through a lead 231 to the pulse width modulator 55, which, as already indicated, controls the voltage applied to the motor 37 in accordance with the incoming pumping rate control signal. More specifically, the pulse width modulator 55 regulates current flow through a lead 228 from a current source 229 and through a lead 230 to the motor 37 which, in turn, is connected through a lead 232 to the common terminal or ground 75.

The before-mentioned switch 195 comprises a double pole-double throw switch operable between a manual operation position and an automatic operation position. One pole or switch blade 235 is connected to the lead 191 extending to the summing amplifier 189 and, when in the manual position, is connected to the common terminal or ground 75, and, when in the automatic position, is connected to the lead 197 extending to the output terminal 123 of the differential detector 99.

The other pole or switch blade 237 is connected through a lead 289 including a resistor 241 to the input terminal 151 of the integrator 153 and, when the switch 195 is in the automatic position, is connected to a non-electrically connected terminal 243 and, when the switch 195 is in the manual position, is connected to the shunt lead 171 between the capacitor 173 and the output terminal 175 of the integrator 153.

Also included in the control circuit 45 is a lead 247 which extends from between the series connected resistors 183 and 185 in the lead 181 and which is connected to two oppositely arranged diodes 249 and 251 which, in turn, are each connected to the common terminal or ground 75.

In operation, the pressure variation signal and the pressure reference signal of opposite polarity are summed to produce the pressure differential or error signal. The pressure differential or error signal is fed to the amplifier 133 and to the integrator 153. The output of the integrator 153 is summed together with a manually controlled pumping rate reference signal and used to control the output voltage of the pulse width modulator 55. This output will vary the speed of the power feed motor 37 such that the pressure differential or error signal will return to zero.

The disclosed control circuit 45 avoids high gain amplification of a feedback signal to reduce an input error signal close to zero, so as thereby to avoid hunting or oscillatory reactions caused by high gain amplification.

In the control circuit 45, the integrator 153, in effect, gives the equivalent of high loop gain with no noticeable hunting or oscillatory reactions. The output voltage of the integrator 153 keeps changing until the pressure differential signal reaches zero. The integrator 153 maintains this output voltage, thereby holding the powder feed constant. Any new pressure error or differential signal will again change the output voltage of the integrator 153 to maintain the pressure level determined by the pressure reference source. In addition, a conventional voltage feedback loop with a gain low enough to cause minimal oscillations is used in parallel with the integrator feedback loop. This helps to make up for the slower response of the integrator 153. The integrator 153 eliminates the need for phase control or damping of the feedback signal.

Various of the features of the invention are set forth in the following claims.

What is claimed is:

1. Apparatus for uniformly feeding particulate matter into a carrier gas, said appratus including a carrier gas conduit, a particulate matter inlet duct communicating with said conduit, means for supplying, into said conduit upstream of said inlet duct, a flow of carrier gas which is under constant above atmospheric pressure prior to introduction into said conduit, a particulate matter pump communicating with said inlet duct and operable at a variable pumping rate to supply particulate matter through said inlet duct to said conduit for conveyance therein solely in response to the introduction into said conduit of the carrier gas, means for sensing the pressure in said conduit downstream of the introduction into said conduit of the carrier gas, and means connected to said pressure sensing means for maintaining a uniform feed of particulate matter into the carrier gas flowing in said conduit by varying the pumping rate of said pump in accordance with pressure variation in said conduit.

2. Apparatus in accordance with claim 1 wherein said means for maintaining uniform feed comprises a variable speed electric motor operably driving said pump and a control circuit including means for introducing a pressure reference signal of one polarity, means connected to said pressure sensing means and responsive thereto for generating a pressure variation signal having a potential which varies in accordance with the pressure in said conduit, means for combining the pressure reference signal and the pressure variation signal to generate a differential signal of variable potential, and means for applying the differential signal to said variable speed electric motor to vary the speed thereof and, accordingly, to vary the feed rate of said pump so as to maintain uniform feed of particulate matter into the carrier gas.

3. Apparatus in accordance with claim 2 wherein said pump includes a housing and a rotor journaled in said housing and rotatably driven by said electric motor.

4. Apparatus in accordance with claim 2 wherein said control circuit further includes means for introducing a pumping rate reference signal of one polarity, and means for combining the differential signal with the pumping rate reference signal to generate a pumping rate control signal of variable potential, and means for applying the pumping rate control signal to said variable speed electric motor to vary the speed thereof and, accordingly, to vary the feed rate of said pump so as to maintain uniform feed of particulate matter into the carrier gas.

5. Apparatus in accordance with claim 4 wherein said means for introducing a pumping rate reference signal comprises a variable potentiometer.

6. Apparatus in accordance with claim 4 wherein the pressure reference signal is of adjustably constant potential, wherein the pressure variation signal has a polarity opposite from the polarity of the pressure reference signal, wherein the differential signal is of variable polarity, wherein the pumping rate reference signal is of adjustably constant potential, and wherein the pumping rate control signal is of the same polarity as the pumping rate reference signal.

7. Apparatus in accordance with claim 2 wherein said means for introducing a pressure reference signal comprises a variable potentiometer.

8. Apparatus in accordance with claim 1 wherein said pressure sensing means is located between said carrier gas supply means and said inlet duct.

9. Apparatus in accordance with claim 1 wherein said pressure sensing means is located downstream from said inlet duct.

10. A method of uniformly feeding particulate matter into a carrier gas, said method comprising the steps of introducing a flow of carrier gas at a constant above atmospheric pressure into a conduit upstream of the introduction of particulate matter into the conduit by a pump operable at a variable pumping rate so as thereby to deliver the particulate matter through the conduit solely in response to the introduction of the carrier gas, sensing the pressure in the conduit downstream of the introduction of the carrier gas, and maintaining uniform particulate matter feed into the carrier gas flowing in the conduit by varying the pumping rate of the pump in accordance with the pressure sensed in the conduit.

11. A method in accordance with claim 10 wherein said step of maintaining uniform feed includes the steps of generating a pressure variation signal having a potential which varies in accordance with the pressure variation in said conduit, introducing a pressure reference signal of one polarity, combining the pressure reference signal and the pressure variation signal to generate a differential signal of variable potential, introducing a pumping rate reference signal of one polarity, combining the differential signal with the pumping rate reference signal to generate a pumping rate control signal of variable potential, and applying the pumping rate control signal to a variable speed electric motor to vary the speed thereof and, accordingly, to vary the feed rate of the pump so as to maintain uniform feed of particulate matter into the carrier gas.

12. Apparatus for uniformly feeding a substance into a carrier gas, said apparatus including a carrier gas conduit, a duct communicating with said conduit for feeding the substance into the conduit, means for supplying into said conduit upstream of said duct, a flow of carrier gas which is maintained under a constant pressure condition above atmospheric prior to supply into said duct, a feed device communicating with said duct and operable at a variable feed rate to supply the substance through said duct to said conduit for delivery in said conduit solely in response to the introduction of carrier gas, means for sensing one of the conditions in said conduit, and means connected to said condition sensing means for maintaining a uniform feed of the substance into the carrier gas flowing in said conduit by varying the feed rate of said feed device in accordance with variation of said one condition in said conduit.

* * * * *